Sept. 7, 1965  R. D. DEANIN ETAL  3,205,198
DI-(BISPHENOL) ETHERS, THEIR POLYCARBONATES, AND
PROCESSES FOR THE PRODUCTION THEREOF
Filed Sept. 12, 1961
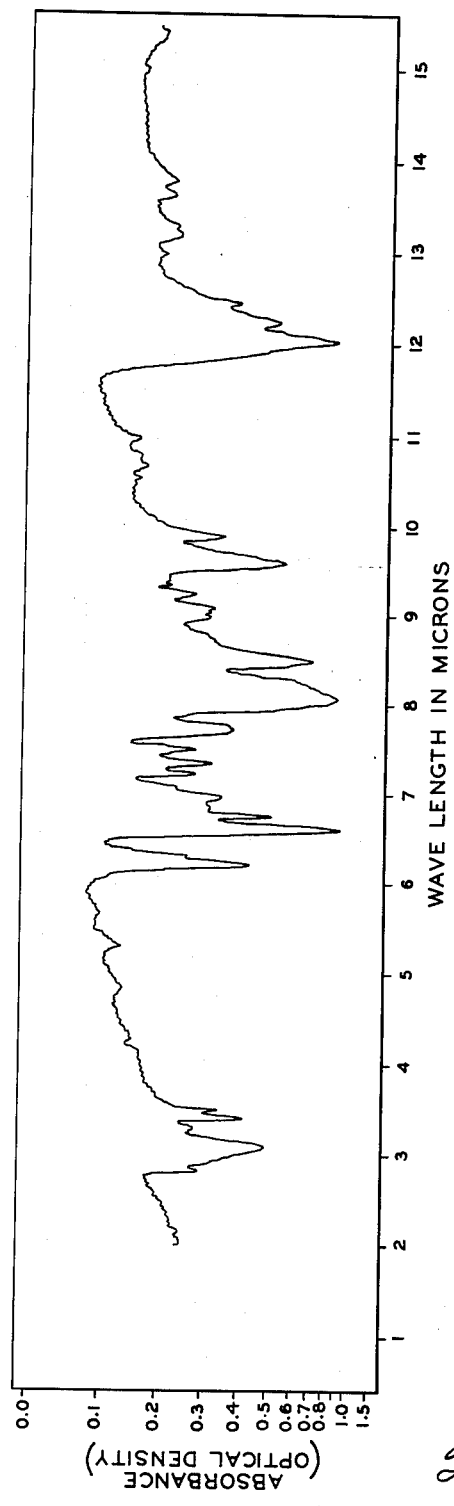
INVENTORS:
RUDOLPH D. DEANIN
BRYCE C. OXENRIDER
ANN V. PINTER
BY
ATTORNEY

United States Patent Office 3,205,198
Patented Sept. 7, 1965

3,205,198
DI-(BISPHENOL) ETHERS, THEIR POLYCARBONATES, AND PROCESSES FOR THE PRODUCTION THEREOF
Rudolph D. Deanin, West Hartford, Conn., and Bryce C. Oxenrider, Florham Park, and Ann V. Pinter, Morristown, N.J., assignors to Allied Chemical Corporation, New York, N.Y., a corporation of New York
Filed Sept. 12, 1961, Ser. No. 137,684
8 Claims. (Cl. 260—47)

This invention relates to novel bisphenols, the di-(bisphenol) ethers, and to their polycarbonates, and processes for the production of those di-ethers and polycarbonates.

It is known that mixed aromatic-aliphatic ethers can be prepared by reacting, for example, methyl iodide with sodium bisphenate.

It is also known to prepare high molecular weight polycarbonates by phosgenating a reaction mixture containing a bisphenol and an acid acceptor, such as the alkali metal of an alkali metal diphenate of the bisphenol in aqueous solution, which may also contain a caustic alkali. In a non-aqueous system it is also known to use an organic base as the acid acceptor, e.g., pyridine. In the procedures employing an aqueous solution, commonly called emulsion procedures, it is customary to introduce phosgene into an intimate mixture or emulsion of the aqueous solution of the alkali metal bisphenate and an organic solvent for the phosgene and for at least the polycarbonates of relatively low molecular weight which are first formed. The bisphenate may or may not all be in solution in the aqueous alkaline phase prior to its reaction with the phosgene. The high molecular weight polycarbonate appears as a solution in or a gel with the organic solvent or as a solid precipitate dispersed in the reaction mixture. In the procedures employing an organic base as the acid acceptor, commonly called solution procedures, the organic base acts as a solvent for the polycarbonate and phosgene and may also serve to catalyze the reaction forming the polycarbonate. A second organic solvent for the polycarbonate and phosgene can also be present in the reaction mixture treated with the phosgene. In these procedures a solution of the polycarbonate in the organic base solvent or mixed solvent is obtained.

In carrying out these known processes for the production of the bisphenol polycarbonates, the phosgene is introduced into and absorbed in the reaction mixture while maintaining it at a suitable reaction temperature, preferably of about 20° C. to about 35° C. It is customary, after the desired amount of phosgene gas has been introduced, to agitate the reaction mixture for a period of time to promote growth of low molecular weight polycarbonate to a higher molecular weight. A catalyst promoting this growth in molecular weight of the polycarbonate usually is introduced into the aqueous emulsion reaction mixture. This addition of catalyst can be made either before or after introduction of the phosgene and before the final period of agitating the reaction mixture to obtain growth in molecular weight of the polycarbonate. Suitable catalysts include quaternary ammonium bases or tertiary amines.

It is also a common expedient, in employing either of the above processes, to control the molecular weight of the polycarbonate by incorporating in the reaction mixture a chain terminator which reacts with the terminal radicals of the growing polycarbonate chains and thus serves to control their growth and to obtain polycarbonates of a desired molecular weight. Suitable chain terminators include the monohydroxy phenols and substituted phenols such as phenol or tertiary butyl phenol, employed under the conditions and in amounts known to the prior art directed to making bisphenol polycarbonates.

In operating in accordance with these known procedures it is known to include in the reaction mixture, in addition to the bisphenol, a second dihydroxy compound, such as a polymethylene glycol, which also reacts to form copolycarbonates with the bisphenol. In the copolycarbonates thus obtained the divalent radicals derived from this second dihydroxy compound and from the bisphenol are all linked through divalent carbonate radicals.

We have discovered that novel bisphenols, the di-(bisphenol) ethers, can be produced by reacting the alkali metal diphenates of a bisphenol alkane, cycloalkane or aralkane, or a halogen derivative of such bisphenol containing the halogen attached to carbon in an aromatic ring, in solution in water with an organic dihalide. Suitable dihalides are the dihaloalkanes, dihaloalkenes, dihalocycloalkanes, dihaloalkyl cycloalkanes, dihaloalkene cycloalkanes, aryl dihaloalkanes and aryl dihaloalkenes, and the dihaloalkane and dihaloalkene ethers and polyethers in which the ether oxygen is separated by at least 2 carbon atoms from each of the two halogen atoms. From these di-(bisphenol) ethers, polycarbonates having novel structures and resulting desirable characteristics can be prepared by the conventional processes, such as those described above, for the preparation of polycarbonates of other bisphenols.

In making a di-(bisphenol) ether in accordance with the processes of our invention a reaction mixture is prepared containing the alkali metal diphenate of the bisphenol in aqueous solution and the dihalo compound in a mole ratio of the diphenate to the dihalo compound greater than 2/1, preferably in the range about 3/1 to about 10/1. So far as the formation of the desired diether is concerned there is no limitation on the maximum value for this ratio, but practical considerations in connection with the production and recovery of the diether are apparent, and excessively high ratios would not be used.

It is not necessary that all the dihalide be soluble in the initial reaction mixture. Even those with quite low solubilities can be reacted with the diphenate by intimately mixing the liquid or solid dihalide with the aqueous phase of the reaction mixture. Or a solution of the dihalide in an organic solvent can be used, intimately mixed with the aqueous solution of the diphenate. Nor is it necessary that sufficient water be present to initially dissolve all the diphenate added in making up the reaction mixture.

The reaction mixture is maintained at a temperature at which the alkali metal diphenate reacts with the dihalo compound forming an alkali metal halide and the alkali metal diphenate of the di-(bisphenol) ether. The minimum reaction temperature will vary, depending upon the dihalo compound employed, from about 100° C. to reflux temperature of the reaction mixture under atmospheric or higher pressures. We prefer to employ reflux temperature. For any given temperature and composition of reaction mixture the occurrence and progress of this reaction can be determined by titration of aliquot portions of the reaction mixture with a standardized dilute, aqueous hydrochloric acid for the amount of alkali metal of the diphenate which has been converted into alkali metal chloride, 2 gram atoms of the alkali metal of the diphenate combining with 2 gram atoms of halogen to form 2 moles of alkali metal chloride and 1 mole of the di-(bisphenol) ether. A representative equation for this reaction employing the sodium bisphenate of 2,2-bis(hydroxyphenyl) propane and ethylene bromide, is as follows:

(1)
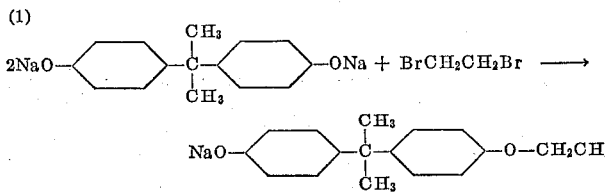
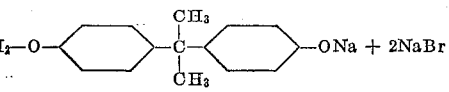

Once a desired temperature and time have thus been determined this titration of a sample of the reaction mixture may be used as a process control means.

The alkali metal diphenates of the di-(bisphenol) ethers have low solubilities even at room temperatures in the aqueous reaction liquor in which they are formed and in water, as do also the free bisphenol ethers which are formed by acidifying the diphenates with an acid, e.g., aqueous hydrochloric acid. We prefer, therefore, to employ a stoichiometric excess of bisphenol in the reaction mixture to consume all of the organic dihalide and to recover the di-(bisphenol) ether by separating the precipitate of its diphenate from the aqueous phase of the reaction product and washing it with a dilute caustic alkali solution to remove adhering mother liquor containing unreacted bisphenate. The di-(bisphenate) ether thus obtained can be used for the production of the polycarbonates of our invention. On the other hand, by further washing the precipitate with a dilute, aqueous acid, then with water, a more pure di-(bisphenol) ether is obtained, which can be used for any desired purpose including the production of its polycarbonate. In producing these polycarbonates in accordance with our invention, any of the conventional procedures described above for the production of polycarbonates of bisphenates or bisphenols can be employed to react the di-(bisphenate) ethers or di-(bisphenol) ethers of our invention with phosgene in the presence of an acid acceptor to form the polycarbonates of our invention.

Examples of the bisphenols from which their di-(bisphenol) ethers, either as the free bisphenols or as their alkali metal diphenates, and the polycarbonates of these diethers can be prepared by the processes of our invention include, but are not limited to, the following:

2,2-bis(4-hydroxyphenyl) propane (commonly known as bisphenol-A),
bis(4-hydroxyphenyl) methane,
1,1-bis(4-hydroxyphenyl) cyclohexane,
1,1-bis(4-hydroxy-3-methylphenyl) cyclohexane,
2,2-bis(2-hydroxy-4-tert-butylphenyl) propane,
3,4-bis(4-hydroxyphenyl) hexane,
1,1-bis(4-hydroxyphenyl)-1-phenyl ethane,
2,2-bis(4-hydroxyphenyl) butane,
2,2-bis(4-hydroxyphenyl) pentane,
3,3-bis(4-hydroxyphenyl) pentane,
2,2-bis(4-hydroxyphenyl)-3-methyl butane,
2,3-bis(4-hydroxyphenyl) hexane,
2,2-bis(4-hydroxyphenyl)-4-methyl pentane,
2,2-bis(4-hydroxyphenyl) heptane,
4,4-bis(4-hydroxyphenyl) heptane,
2,2-bis(4-hydroxyphenyl) tridecane, and
1,4-bis(4-hydroxycumyl) benzene.

as well as halogen derivatives of those bisphenols, e.g., 2,2-bis(4-hydroxy-3-chlorophenyl) propane,
2,2-bis(4-hydroxy-3,5-dibromophenyl) propane and
1,4-bis(4-hydroxycumyl) tetrachlorobenzene.

The organic dihalides preferably employed in the processes of our invention, because of their relative availability and cheapness, are those in which the halogen is chlorine or bromine. The dihalo compounds which can be used include, but are not limited to Ethylene bromide,
1,2-dibromopropane,
1,3-dibromopropane,
1,2-dibromobutane,
1,4-dibromobutane,
1,4-dibromopentane,
1,5-dibromopentane,
Bis-(2-bromoethyl) ether,
2,3-dibromohexane; and
1,10-dibromodecane,
1,6-dibromo-3-hexene
1,4-dichlorocyclohexane,
1,4-dichlorocyclopentane,
1,4-dichloromethyl cyclohexane,
1,4-dichloroethyl cyclohexane,
1,4-bis(4-chloro-2-butenyl) cyclohexane,
1,4-bis(3-bromopropenyl) benzene,
1,4-bis(4-bromo-2-butenyl) benzene,
1,4-bis(β-bromoethoxy) benzene,
1,4-bis(β-bromoethoxyethyl) benzene,
1,4-bis(3-bromopropenoxy) benzene, and
1,4-bis(3-bromopropenoxyethyl) benzene.

Furthermore, we prefer to employ the dihaloalkanes containing a bridge of 1 to 12 carbon atoms between the two halogen atoms and the dihaloalkane ethers or polyethers containing a bridge of 4 to 12 carbon atoms interrupted by ether-oxygen in which the ether-oxygen is separated by at least 2 carbon atoms from each of the two halogen atoms. The dichloro compounds corresponding to each of the above dibromo compounds are also among the preferred dihalo compounds.

The polycarbonates prepared by the processes of our invention are particularly suitable for the production of films and molded articles. By varying the bisphenol and the dihalide employed in the preparation of the di(bisphenol) ethers, the properties of the films or molded articles made from the polycarbonates of the ethers can be varied for particular uses to which they are to be put. However, the uses for our polycarbonates are not limited to films or molded articles. They are useful in the preparation of coating compositions, for which purpose they can be heated with drying oils, such as dehydrated castor oil, to modify the solubility characteristics of the polycarbonates in solvents commonly used for preparing coating compositions and the character of the films deposited on substrates by those compositions. Our polycarbonates can also be used for the production of fibers by spinning their solutions or melts.

The alkali metal diphenates of the di-(bisphenol) ethers of our invention have the structure (2)
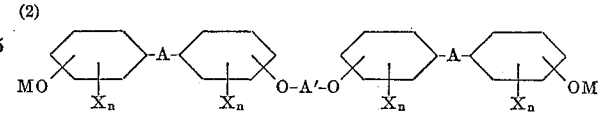

in which M is an alkali metal, A is a divalent alkane, cycloalkane or aralkane radical or a divalent halogen substituted aralkane radical containing the halogen attached to carbon in an aromatic ring, A′ is a divalent radical derived from an organic dihalide by removal of the two halogen atoms from a dihaloalkane, dihaloalkene, dihalocycloalkane, dihaloalkyl cycloalkane, dihaloalkene cycloalkane, aryl dihaloalkane, aryl dihaloalkene, or a dihaloalkane or dihaloalkene ether or polyether in which the ether-oxygen is separated by at least 2 carbon atoms from each of the two halogen atoms, X is a halogen atom or an alkane radical and $n$ is an integer from 0 to 4. The two radicals represented by A may be the same or different in composition. Our di-(bisphenol) ethers have the above defined structures in which M is replaced by an atom of hydrogen.

The polycarbonates prepared by the processes of our invention are characterized by containing the repeating units (3) 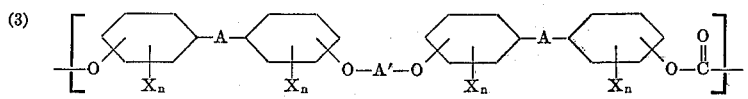

wherein A, A', X and $n$ are as defined above. The terminal valences of the copolymer products of our process are satisfied by radicals derived from a chain terminator, by —M or the —OM radical of above Structure 2, or by —H or the hydroxyl radical.

Our preferred novel products are the alkylene di-[bis-(4-hydroxyphenyl) alkane] ethers in which the alkylene diether radical, —O—A'—O of above Structures 2 and 3 contains a bridge of 1 to 12 carbon atoms between the two ether-oxygen atoms, and the diphenates and polycarbonates of those alkylene di-[bis(4-hydroxyphenyl)-alkane] ethers; particularly those alkylene di-(bisphenol) ethers, diphenates and polycarbonates in which each of the two phenylene radicals of the bisphenol radical,

of Structures 2 and 3 when $n=0$, are linked to a carbon atom of which all valences are satisfied by four other carbon atoms, as in the alkylene di-[2,2-bis(4-hydroxyphenyl) propane] ether or the alkylene di-[1,4-bis(4-hydroxycumyl) benzene] ether.

Our invention is more particularly described and illustrated by the following examples for the production of an alkylene di-(bisphenol) ether, its diphenate and its polycarbonates. The intrinsic viscosity and molecular weight given are those calculated from the effluent times of an 0.1% solution of the polycarbonate in ethylene chloride and of the ethylene chloride solvent as measured in an Ostwald-Fenske viscometer at 25° C., using the following equations:

$$N_r = \frac{\frac{T}{T'}-1}{C}$$

$$N_i = N_r - 0.02$$

$$M.W.^{0.83} = \frac{N_i}{1.23 \times 10^{-4}}$$

In these equations T and T' are the effluent times of the solution of the polycarbonate and of the solvent, respectively, C is the concentration of the polycarbonate in the solution in grams/100 cc. of solvent, and M.W. is the molecular weight of the polycarbonate.

*Example 1*

A reaction vessel fitted with a stirrer, reflux condenser, thermometer and gas inlet dip tube was charged with 2 liters of water in which 84 gms. of 95% caustic soda (2 moles) were dissolved. With nitrogen gas introduced to sweep out the air in the vessel, and maintain an inert atmosphere in the vessel, 228 gms. of bisphenol-A (1 mole) were introduced and dissolved in the caustic alkali solution to form a clear solution of aqueous sodium bisphenate. Ethylene bromide, totaling 18.8 gms. (0.1 mole), was added and the mixture was stirred and refluxed one hour at 100° C. A heavy white precipitate formed and was present in the reaction product.

The foregoing procedure was repeated, the two reaction products were combined and the heavy white precipitate was separated from the aqueous solution by filtration, washed with dilute, aqueous caustic soda solution, then with a dilute, aqueous hydrochloric acid solution and finally with water until the wash water was neutral. The recovered solid was dissolved in 1500 cc. of hot xylene and the solution distilled to remove over-head the water present together with a portion of the xylene. On cooling the dry xylene solution, a white powder crystallized out, was filtered off and maintained at 95° C. under vacuum to constant weight.

The accompanying drawing shows the infra-red spectrum of the white powder thus obtained. This infra-red spectrum shows all the absorption peaks of the several groups present in the polyether product of this example having the structure (4) 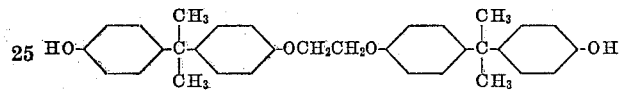

Especially it shows the strong absorption peaks at 8.05–8.1 and at 9.55–9.6 microns wave length, due to the presence of the aromatic-aliphatic ether group which particularly characterizes the polyethers of our invention. The product was analyzed and found to contain 7.02% phenolic hydroxyl, 0.00% bromine and 0.30% ash. Theoretical phenolic hydroxyl and bromine for the compound having the above structure are 7.05% and 0.00%, respectively. Thus the product of this example was shown to be the ethylene di-[2,2-bis(4-hydroxyphenyl) propane] ether of Formula 4.

*Example 2*

The apparatus described in Example 1 was employed for the preparation of the polycarbonate of the ethylene di-(bisphenol alkane) ether produced and purified in the manner described in Example 1. With an atmosphere of nitrogen maintained in the reaction vessel, and its contents stirred, 39.6 gms. pyridine and 846 gms. methylene chloride were introduced, followed by 60.25 gms. of the ethylene di-(bisphenol alkane) ether. The diether dissolved in the pyridine-methylene chloride mixture and the solution was cooled to 0° C. in a salt-ice bath. The flow of nitrogen into the reaction vessel was discontinued and phosgene gas was bubbled slowly into the stirred solution over a period of 2 hours, during which time 17.5 gms. phosgene was introduced at a substantially uniform rate, with the solution being maintained at 0° C. Following introduction of the phosgene, the solution was stirred for an additional hour, under a nitrogen atmosphere and at 30° C., for growth in molecular weight of the polycarbonate which was formed. The solution thus obtained was washed twice with dilute aqueous hydrochloric acid and then with water until the wash water was neutral.

The solution thus produced was found to contain a polymer amounting to 89% of theory based on the diether supplied to the reaction mixture. Infra-red analysis of this solution showed the polymer contained about a 54/46 ratio of carbonate bonds to ethylene ether bonds. A film of the polycarbonate cast from a portion of this solution had an ultimate elongation of 18.8%, an ultimate tensile strength of 6915 p.s.i., a yield point of 7448 p.s.i. and an Instron tear 150.

Precipitation of the polycarbonate from another portion of the solution by addition first of 80 wt. parts acetone and 100 wt. parts of methanol to 100 wt. parts of the solution, resulted in a 95.4% recovery of high molecular weight polycarbonate, leaving in solution 4.6% of lower molecular weight polymer. Carver pressings of this polymer at 160° to 240° C. gave fused, clear, white, tough, rigid sheets.

The solid polymer thus recovered had an intrinsic viscosity of 0.609 and a molecular weight of 28,200. It had a sharp melting point of 117°–118° C. under crossed Nicol prisms. The purified, high molecular weight polymer contained repeating units having the following structure in the polymer molecules;

(5)
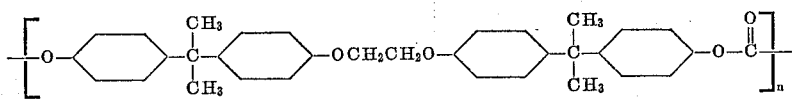

in which $n$ is about 56.

The higher ratio (54/46) of carbonate to ethylene ether bonds in the polycarbonate in solution in methylene chloride than that of Formula 5 for the high molecular weight polycarbonate precipitated from that solution, where $n$ is about 56, is ascribed to the presence of low molecular weight polycarbonate in which the molecular chains were terminated at both ends by carboxy radicals.

*Example 3*

A flask provided with a reflux condenser and a stirrer was charged with 300 cc. deionized water, 0.5 gm. mole NaOH and 0.25 gm. mole of bisphenol-A. To the aqueous solution of sodium bisphenate thus prepared, 0.0625 gm. mole of ethylene chloride were introduced. The reaction mixture thus prepared contained .25 mole ethylene chloride and 2 moles caustic soda for every 1 mole of the bisphenol-A. This solution was heated under reflux temperatures rising from 90° C. to 103° C. for 17 hours with continued stirring. The resulting reaction product was cooled to room temperature and the precipitate of white powder which formed was separated from the mother liquor and dried. The dried material thus obtained corresponded to a 73.7% theoretical yield of the sodium phenate of ethylene di-[2,2-bis(4-hydroxyphenyl) propane] ether based on the ethylene chloride supplied to the process.

The dried precipitate was washed with diluted aqueous HCl and then with water until the wash liquor was neutral. The infrared spectrum of the bisphenol diether thus obtained showed it to contain all the groups present in the diether structure shown by above Formula 4. Analysis for phenolic OH of the material showed it contained 7.25±0.13% OH. The product of this process was ethylene di-[2,2-bis(4-hydroxyphenyl) propane] ether accompanied by minor amounts of impurities.

Any of the bisphenols and dihalo compounds listed above can be substituted in the same mol ratios for the bisphenol-A and ethylene chloride used in preparing the reaction mixture in Example 3, and by heating the reaction mixture at reflux temperatures until titration shows about 2 gram atoms of the alkali metal have reacted with the halogen of the dihalide, the corresponding di-(bisphenol) ether can be produced and recovered from the reaction mixture in the manner described in this example. The di-(bisphenol) ether can then be converted into the polycarbonate by the procedure of Example 2.

We claim:
1. A di-(bisphenol) ether having the structure

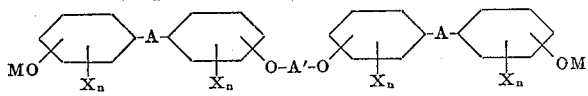

wherein M is a member selected from the group consisting of hydrogen and an alkali metal; A is a member of the group consisting of the divalent alkane, cycloalkane, aralkane, and halogen substituted aralkane radicals containing the halogen attached to carbon in an aromatic ring; A' is a divalent radical derived from an organic dihalide by removal of the two halogen atoms from a member of the group consisting of the dihaloalkanes, dihaloalkenes, dihalocycloalkanes, dihaloalkyl cycloalkanes, dihaloalkene cycloalkanes, aryl dihaloalkanes, and aryl dihaloalkenes, and the dihaloalkane and dihaloalkene ethers and polyethers in which the ether oxygen is separated by at least two carbon atoms from each of the two halogen atoms; X is a member of the group consisting of the halogen atoms and the alkane radicals; and $n$ is an integer from 0 to 4.

2. An alkylene di-[bis(4-hydroxyphenyl) alkane] ether in which the alkylene diether radical contains a bridge of 1 to 12 carbon atoms between the two ether-oxygen atoms.

3. Ethylene di - [2,2 - bis(4-hydroxyphenyl) propane] ether.

4. The alkali metal diphenate of an alkylene di-[bis(4-hydroxyphenyl) alkane] ether in which the alkylene diether radical contains a bridge of 1 to 12 carbon atoms between the two ether-oxygen atoms.

5. The alkali metal diphenate of ethylene di-[2,2-bis(4-hydroxyphenyl) propane] ether.

6. The polycarbonates of the di-(bisphenol) ethers consisting of repeating units of the formula

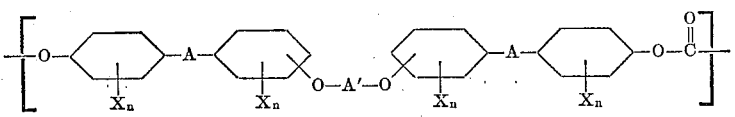

wherein A is a member selected from the group consisting of divalent alkane, cycloalkane and aralkane radicals and divalent halogen substituted aralkane radicals containing the halogen attached to carbon in an aromatic ring; A' is a divalent radical derived from an organic dihalide by removal of the two halogen atoms from a member of the group consisting of the dihaloalkanes, dihaloalkenes, dihalocycloalkanes, dihaloalkyl cycloalkanes, dihaloalkene cycloalkanes, aryl dihaloalkanes, and aryl dihaloalkenes, and the dihaloalkane and dihaloalkene ethers and polyethers in which the ether oxygen is separated by at least two carbon atoms from each of the two halogen atoms; X is a member of the group consisting of halogen atoms and alkane radicals and $n$ is an integer from 0 to 4.

7. The polycarbonates of claim 6, wherein A′ is an alkylene group containing a bridge of 1 to 12 carbon atoms between the two ether-oxygen atoms.

8. The polycarbonates of ethylene di-[2,2-bis(4-hydroxyphenyl) propane] ether consisting of repeating units of the formula

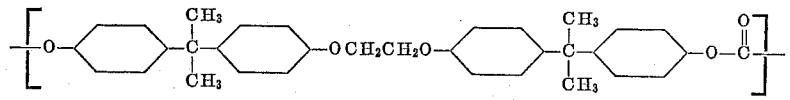

References Cited by the Examiner

UNITED STATES PATENTS

| | | | |
|---|---|---|---|
| 1,950,516 | 3/34 | Prutton | 260—61 |
| 2,060,715 | 11/36 | Arvin | 260—61 |
| 3,069,386 | 12/62 | Barclay | 260—47 |

FOREIGN PATENTS 809,735   3/59   Great Britain.

OTHER REFERENCES

Schnell: Angewandte Chemie, 68, No. 20, pp. 633–640, October 21, 1956.

WILLIAM H. SHORT, *Primary Examiner.*

LOUISE P. QUAST, *Examiner.*